Patented Sept. 24, 1929

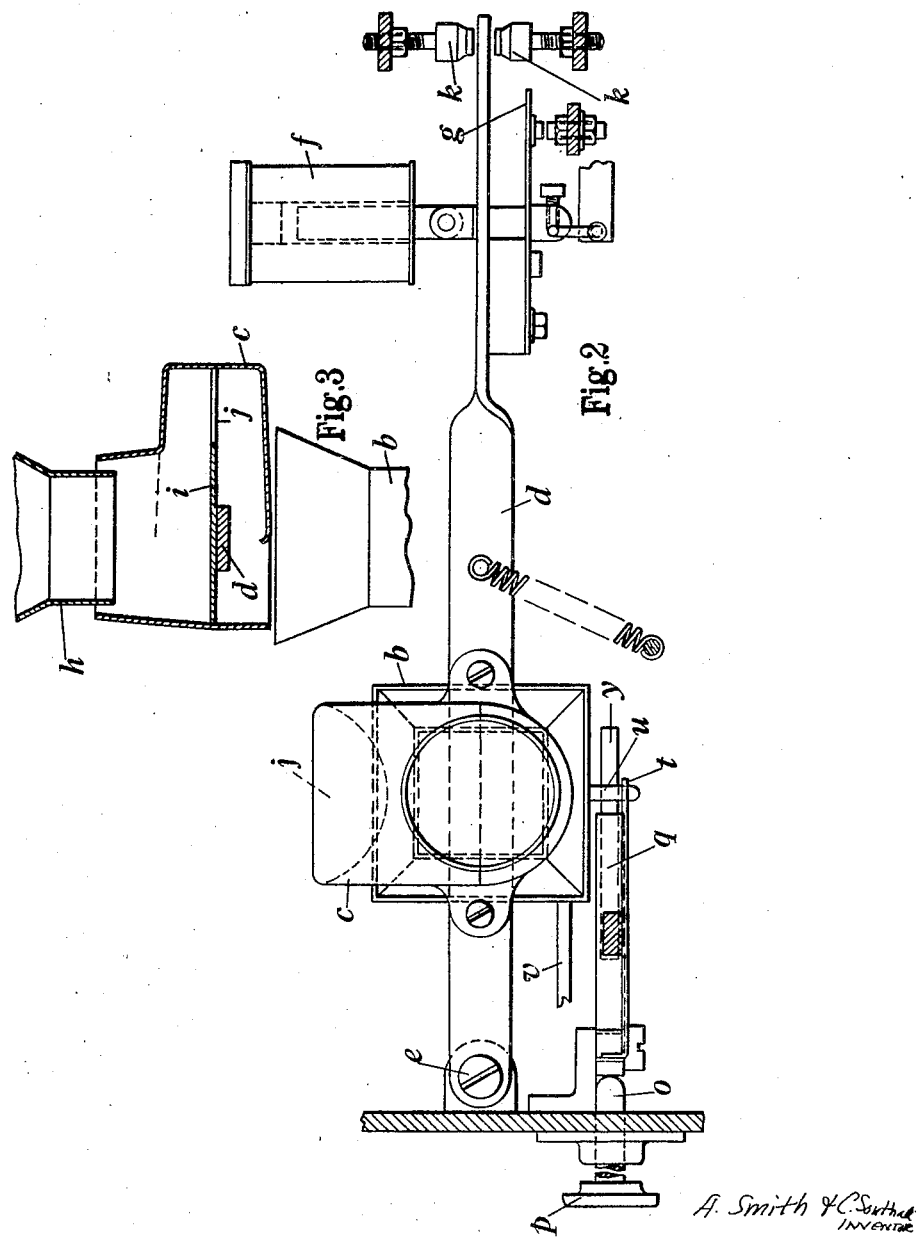

1,729,192

UNITED STATES PATENT OFFICE

ARTHUR SMITH AND CHRISTOPHER SOUTHALL, OF BIRMINGHAM, ENGLAND

AUTOMATIC WEIGHING MACHINE

Application filed October 15, 1928, Serial No. 312,633, and in Great Britain December 5, 1927.

This invention has for its object to provide an improved automatic weighing machine of simple and reliable construction adapted more particularly for the weighing out of small quantities of tea and other analogous substances.

The invention comprises the combination with a supply hopper and a pan on a weigh beam, of an electromagnetically vibrated feed regulator, the latter comprising a receptacle which is open at its upper side to the lower end of the hopper, and is also open at its underside above the weigh beam pan, the inlet and outlet being separated by a transverse partition which prevents flow of material through the feed regulator excepting when the latter is subjected to a horizontal vibratory movement.

In the two accompanying sheets of explanatory drawings:—

Figure 3 is a cross section of the feeding device.

Figure 1:
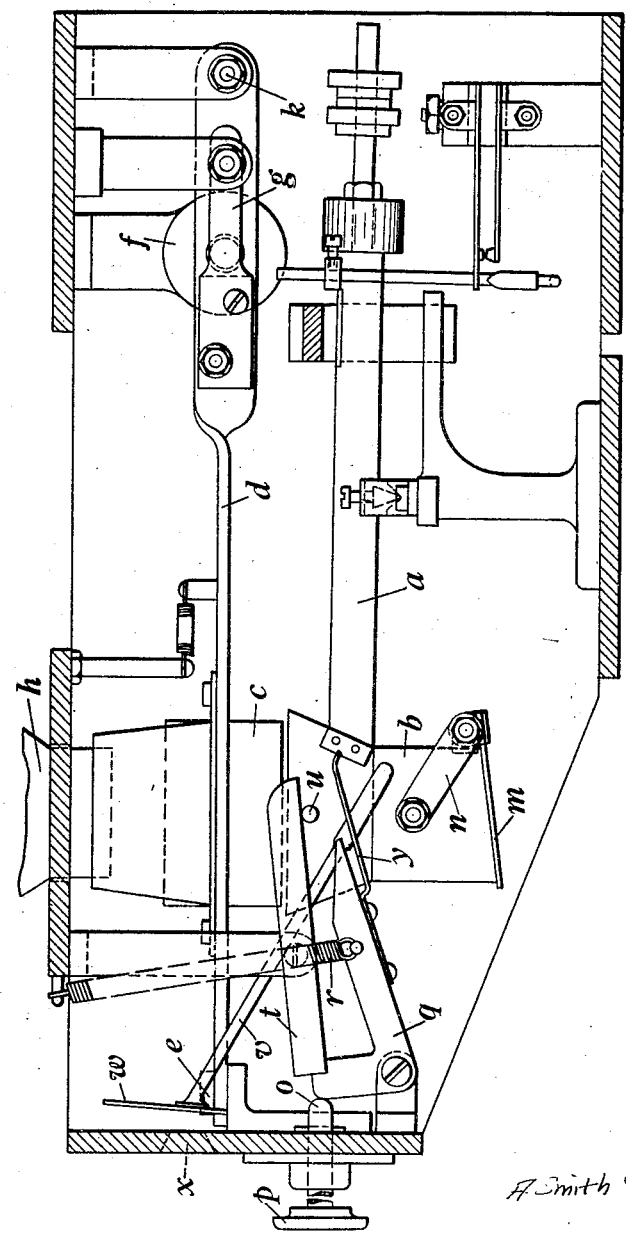
Figure 1 is a side elevation and Figure 2 a plan of a portion of an automatic weighing machine constructed in accordance with this invention.

In carrying the invention into effect as shown, in Figure 1–3, we employ any convenient form of counter-balanced weigh beam $a$ having a weigh pan $b$ at one end. The weigh pan may be adapted in any convenient manner to discharge its contents after the proper weight of material has been supplied to it. The discharge of the pan may be effected by electromagnetic means controlled by the weigh beam; this feature forms no part of our present invention.

Above the pan is arranged a receptacle $c$ herein termed the feed regulator. This receptacle is carried by a horizontal spring controlled arm $d$ which is pivoted at $e$ and is capable of being vibrated in a horizontal plane under the action of an electromagnet or solenoid $f$. The required intermittent interruption of the magnet circuit is effected by a contact device $g$ in conjunction with the arm. To set the arm in motion, it is only necessary to close a switch (not shown). The magnet circuit may also be placed under the control of the beam $a$, so that when the proper quantity of material has been fed into the pan, the tilting of the beam causes the magnet circuit to be opened.

The feed regulator (shown in cross section at Figure 3) is open at its upper side to the underside of the feed hopper $h$ into which a supply of tea or other material is placed, and preferably the feed regulator and the delivery portion of the hopper overlap as shown sufficiently to avoid escape of material without interfering with the requisite free lateral movement of the regulator. The latter is also open at its underside, and transversely across the interior is arranged a partition $i$ which separates the upper and lower parts of the regulator whilst allowing free communication between those parts at one end of the partition. In effect, the arrangement is such that the partition forms the bottom of the receptacle by which the feed is regulated, and at one side of the receptacle a passage $j$ is formed through which the material can flow to the outlet at the underside of the receptacle. It will be understood that any construction of regulator equivalent to the above, may be employed. When the regulator is at rest, no material can flow through it from the hopper to the weigh pan. Delivery of material only occurs when a relatively rapid lateral vibration of reciprocatory movement is imparted to the regulator. The material is then shaken through in a manner which enables the required accurate weighing of small quantities to be obtained. The amplitude of vibration of the arm $d$ is limited by stops $k$. The impact of the arm against the stops may be utilized to promote free flow of material through the feed regulator.

By this invention we are able to construct an automatic weighing machine of very simple form involving a small number of moving parts. Machines of this kind are particularly suited to the weighing out of small quantities of tea in large restaurants where uniformity in the quantity of the tea served out to the customers, and economy in the use of tea, depends upon the accuracy of the amount placed in each tea pot. Whilst primarily intended for measuring out tea, the machine is also applicable to other like uses.

Figure 4:
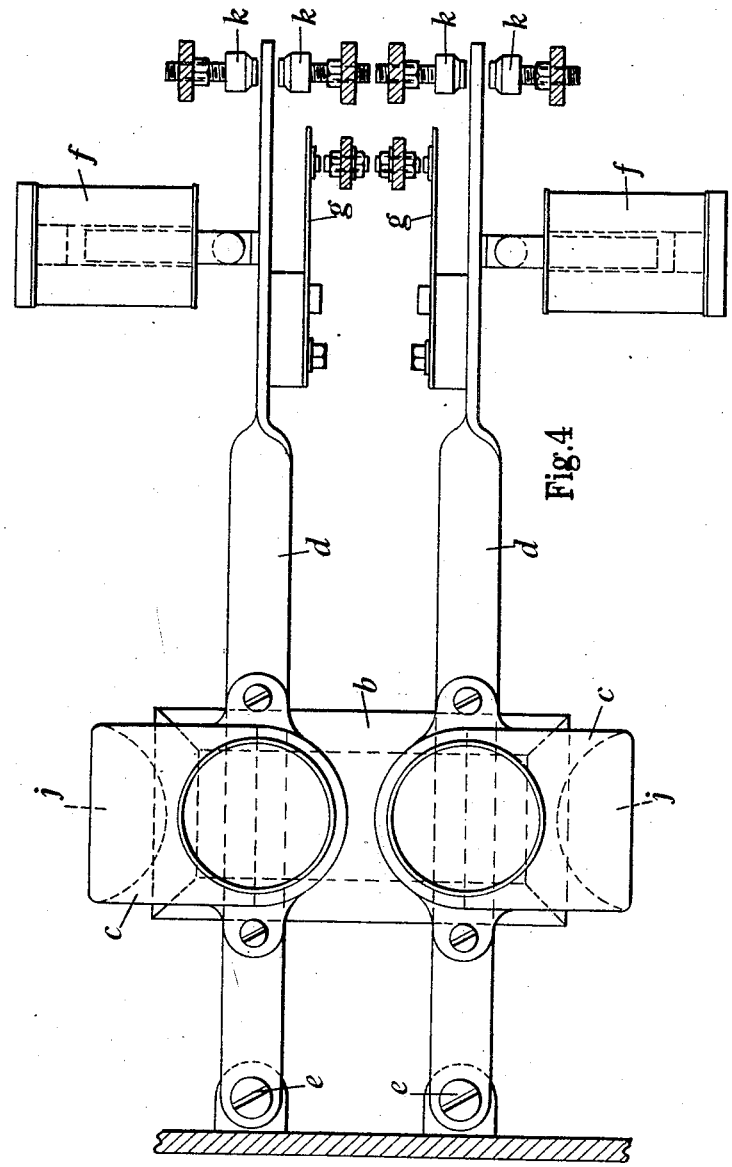
Figure 4 is a plan of an arrangement in which a pair of feeding devices are arranged to deliver into the same weigh pan.

The invention is not limited to any particular subordinate details, as these may be varied to meet different requirements. For some purposes it is advantageous to employ a pair of feed regulators, one for delivering what is known as the coarse feed to the weigh pen, and the other for delivering the fine feed, or dribble, whereby the weighing is completed. Each regulator receives its own supply of material from a hopper and both discharge into the same weigh pan beneath. Such an arrangement is shown in Figure 4, the arrangement being a duplication of that already described. The rate at which material is delivered by the dribble regulator is less than that of the coarse feed regulator, and the difference may be produced either by making the passage $j$ smaller, or by adjusting the rate or amplitude of oscillation of the regulator or by restricting the supply from the hopper, or in any other convenient manner.

The machine illustrated in Figures 1 and 2 is particularly adapted for weighing small quantities of tea in cafés each delivery corresponding to the amount required in a given tea pot. The pivoted door $m$ at the bottom of the weigh pan is held closed by a spring or weight (not shown) and is provided with an opening lever $n$. The door can be opened for the discharge of the contents by a push piece $o$ actuated by a knob $p$. The push rod acts on a bell crank lever $q$ controlled by a spring $r$. A finger piece $y$ on the long arm of the lever $q$ is arranged to strike the lever $n$ and so open the door when the knob $p$ is pressed inwards. The lever $q$ is normally locked by a lever $t$, one end of which engages the lever $q$ whilst the other end rests on a peg $u$ on the weigh pan, the lever $t$ being counterweighted. This locking device prevents the weigh pan from being emptied until its charge is complete. When the weigh pan drops after receiving a proper charge, the adjacent end of the lever $t$ falls with it and allows the other end to release the lever $q$. Secured to the weigh pan is an arm $v$ carrying an indicator $w$ visible through an opening $x$. The indicator serves to tell the attendant that the pan has dropped and is ready for the delivery of its charge.

Having thus described our invention what we claim as new and desire to secure by Letters Patent is:—

1. In automatic weighing machines, the combination comprising a supply hopper, a weigh pan, a weigh beam on which the pan is carried, a vibratory feed regulator located between the hopper and the weigh pan, and electromagnetic means for vibrating the regulator, the said regulator comprising a receptacle which is open at its upper side to the lower end of the hopper, and is also open at its under side above the weigh beam pan and a transverse partition which separates the inlet side from the outlet side and prevents flow of material through the regulator excepting when the latter is subjected to a horizontal vibratory movement, substantially as described.

2. In automatic weighing machines, the combination comprising a supply hopper, a weigh pan, a weigh beam on which the pan is mounted, a feed regulator located between the hopper and the weigh pan, a pivoted arm capable of oscillating in a horizontal plane and having the regulator mounted thereon, and electromagnetic means acting on the arm for producing the vibratory movements, the regulator comprising a receptacle which is open at its upper side to the lower end of the hopper, and is also open at its under side above the weigh beam pan, and a transverse partition which separates the inlet side from the outlet side and prevents flow of material through the regulator excepting when the latter is subjected to a horizontal vibratory movement, substantially as described.

3. In automatic weighing machines, the combination comprising a supply hopper, a weigh pan, a weigh beam on which the pan is mounted, a vibratory feed regulator located between the hopper and the pan, a pivoted arm on which the regulator is mounted, a spring adapted to impart motion to the arm in one direction, an electromagnetic device for imparting movement to the arm in the opposite direction, these movements being in a horizontal plane, a contact breaker actuated by the arm for controlling the circuit containing the said electromagnetic means, and stops for limiting the movement of the arm, the said feed regulator comprising a receptacle which is open at its upper side to the lower end of the hopper, and is also open at its under side above the weigh beam pan, and a transverse partition which separates the inlet side from the outlet side and prevents flow of material through the regulator excepting when the latter is subjected to a horizontal vibratory movement, substantially as described.

4. In an automatic weighing machine as claimed in claim 1, the combination with the weigh pan, of a hinged delivery door on the pan, a door actuating lever pivoted on the machine, a locking lever pivoted on the machine and adapted to engage the actuating lever, means on the pan for controlling the locking lever, and a finger piece for imparting movement to the actuating lever, substantially as described.

5. In an automatic weighing machine as claimed in claim 1, the combination with the weigh pan, of a hinged delivery door on the pan, a door actuating lever pivoted on the machine, a locking lever pivoted on the machine and adapted to engage the actuating lever, means on the pan for controlling the locking lever, a finger piece for imparting movement to the actuating lever, and an indicator attached to the weigh pan, substantially as described.

In testimony whereof we have signed our names to this specification.

ARTHUR SMITH.
CHRISTOPHER SOUTHALL.